United States Patent
Sekar et al.

(10) Patent No.: US 10,817,382 B2
(45) Date of Patent: Oct. 27, 2020

(54) CONCURRENT UPGRADE OF PRIMARY AND STANDBY DATABASES

(71) Applicant: Dell Products, L.P., Round Rock, TX (US)

(72) Inventors: Ponnayan Sekar, Bangalore (IN); Deepa Sreekumar, Bangalore (IN); Sathish Kumar Bikumala, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 353 days.

(21) Appl. No.: 15/597,607

(22) Filed: May 17, 2017

(65) Prior Publication Data
US 2018/0336103 A1 Nov. 22, 2018

(51) Int. Cl.
*G06F 11/14* (2006.01)
*G06F 16/178* (2019.01)
*G06F 16/182* (2019.01)
*G06F 16/21* (2019.01)
*G06F 3/06* (2006.01)
*G06F 16/11* (2019.01)

(52) U.S. Cl.
CPC ........ *G06F 11/1451* (2013.01); *G06F 3/0607* (2013.01); *G06F 3/0647* (2013.01); *G06F 11/1456* (2013.01); *G06F 16/119* (2019.01); *G06F 16/178* (2019.01); *G06F 16/183* (2019.01); *G06F 16/214* (2019.01); *G06F 2201/80* (2013.01); *G06F 2201/82* (2013.01)

(58) Field of Classification Search
CPC .. G06F 11/1451; G06F 16/214; G06F 16/183; G06F 16/178; G06F 11/1456; G06F 2201/805; G06F 2201/80; G06F 2201/82; G06F 3/0607; G06F 11/1433; G06F 16/119; G06F 3/0647
See application file for complete search history.

(56) References Cited

U.S. PATENT DOCUMENTS

| | | | | |
|---|---|---|---|---|
| 8,635,246 B1* | 1/2014 | Kohler | .................. | G06F 16/278 707/781 |
| 8,745,445 B1* | 6/2014 | Choi | ..................... | G06F 16/214 714/16 |
| 9,122,716 B1* | 9/2015 | Naganathan | ............ | G06F 16/27 |
| 9,286,052 B1* | 3/2016 | Solan | ........................ | G06F 8/65 |

(Continued)

*Primary Examiner* — David T. Brooks
(74) *Attorney, Agent, or Firm* — Fogarty LLP (57) ABSTRACT

Methods and systems are provided for concurrently upgrading a primary database and a standby database that is synchronized with the primary database, while still protecting the stored data from the risk of hardware or other failure during the upgrade process. The standby database is mounted to an NFS (Network File System) located on a database access node. The upgraded primary and standby databases are built and mounted to the NFS mount point. A level-zero backup and one or more incremental backups of the deprecated standby database are generated. Each backup may be concurrently transferred to the upgraded databases via the mount point. Upon generation of a final incremental backup, the primary database is frozen and the tablespace metadata to transferred to the upgraded databases via the mount point. The upgraded primary database may be started upon importing of the tablespace metadata.

20 Claims, 4 Drawing Sheets

(56) References Cited

U.S. PATENT DOCUMENTS

| | | | | |
|---|---|---|---|---|
| 2003/0130985 | A1* | 7/2003 | Driesen | G06F 16/20 |
| 2010/0088281 | A1* | 4/2010 | Driesen | G06F 8/65 |
| | | | | 707/641 |
| 2010/0332526 | A1* | 12/2010 | Nori | G06F 16/213 |
| | | | | 707/769 |
| 2011/0246419 | A1* | 10/2011 | Yancey | G06F 11/14 |
| | | | | 707/624 |
| 2012/0089625 | A1* | 4/2012 | Bentzien | G06F 16/2336 |
| | | | | 707/756 |
| 2012/0101998 | A1* | 4/2012 | Cahill | G06F 16/2329 |
| | | | | 707/654 |
| 2012/0239616 | A1* | 9/2012 | Cunningham | G06F 16/273 |
| | | | | 707/620 |
| 2013/0159247 | A1* | 6/2013 | Engelko | G06F 16/23 |
| | | | | 707/609 |
| 2014/0068584 | A1* | 3/2014 | Lim | G06F 11/2094 |
| | | | | 717/168 |
| 2014/0379656 | A1* | 12/2014 | Driesen | G06F 16/2329 |
| | | | | 707/638 |
| 2015/0142728 | A1* | 5/2015 | Nigam | G06F 16/21 |
| | | | | 707/609 |
| 2016/0117337 | A1* | 4/2016 | Aron | G06F 16/9024 |
| | | | | 707/690 |
| 2017/0123787 | A1* | 5/2017 | Burkhardt | G06F 8/66 |
| 2017/0212947 | A1* | 7/2017 | Zheng | G06F 16/21 |
| 2018/0004793 | A1* | 1/2018 | Desai | G06F 16/219 |

* cited by examiner

CONCURRENT UPGRADE OF PRIMARY AND STANDBY DATABASES

FIELD

This disclosure relates generally to upgrading databases implemented using one or more Information Handling Systems (IHSs) and, more specifically, to reducing the downtime required for upgrading a primary and a standby database.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may be organized into data storage systems that include any number of databases. In many instances, these databases are components of enterprise data systems that store various forms of data. In certain data storage systems, the data stored in a primary database may be replicated on one or more standby databases. A standby database maintains a redundant copy of the data stored by the primary database, thus providing a backup copy of the primary data that can be used to restore the primary database. A standby database provides a means for recovering the primary data in the case of an IHS or other equipment failures, network failures, natural or man-made disasters, malicious actors or any other scenario that may result in permanent or temporary loss of the primary database. In certain scenarios, a standby database may be geographically separated from the primary database. In certain instances, a standby database may also be used to provide additional access to the primary data while also reducing the burden on the primary database.

In order for a standby database to serve as viable backup copy of the primary database, the standby database must remain synchronized with the primary database. Each transaction affecting the primary database must be likewise replicated on the standby database. In some cases, the standby database may maintain a history of the changes to the primary database, thus providing the ability to return to various different recovery points. Any errors or delays in replicating primary data transactions to the standby database creates the possibility of discrepancies between the two sets of data, which diminishes the value of the standby database. Consequently, data storage systems, especially those storing critical business data, seek to provide standby databases that are synchronized exactly with a primary database at all times. Such synchronized data storage system may be provided with assurances that a standby database will include all of the data stored by a primary database.

One scenario in which discrepancies can arise between a primary database and a standby database is when one or both of these databases are upgraded. In may be necessary to upgrade the databases in order to maintain hardware compatibility, utilize features in newer versions of the database software, address errors in the current database, close security loopholes, and/or for any number of additional reasons. In many instances, the integrity of the data may be maintained during such upgrades by separately upgrading the primary database and the standby database one at a time. This ensures that a failure during the upgrade process does not compromise the data, but may require taking both the primary and standby databases offline for the duration of the upgrade process. Since such database upgrades can be lengthy, the resulting inaccessibility of the data may be unacceptable.

One option for reducing the downtime required for the migration to upgraded primary and standby databases is to upgrade one of the databases, while the other database remains operational. Once the first upgrade is completed, the changes made to the operational database during the upgrade process are synchronized to the upgraded database. The upgraded database then becomes operational and the other database is taken offline and upgraded. Such an upgrade reduces system unavailability, but subjects the data to significant risk during the duration of the upgrade process.

SUMMARY

Methods and computer-readable storage devices storing program instructions are provided according to various embodiments for concurrently upgrading a primary database and standby database that is synchronized with the primary database. The methods and program instructions may include: mounting the standby database to an NFS (Network File System) mount point; mounting an upgraded primary database to the NFS mount point; mounting an upgraded standby database to the NFS mount point generating a level-zero backup of the standby database, wherein the level-zero backup is output to the NFS mount point; copying the level-zero backup from the NFS mount point to the upgraded primary database and concurrently copying the level-zero backup from the NFS mount point to the upgraded standby database; generating an incremental backup of the standby database, wherein the incremental backup is output to the NFS mount point, and wherein the incremental backup reflects the changes to the primary database since the generation of the level-zero backup; and copying the incremental backup from the NFS mount point to the upgraded primary database and concurrently copying the incremental backup from the NFS mount point to the upgraded standby database.

In certain additional embodiments, the NFS mount point is located on one or more database access nodes. Certain additional embodiments further include restricting the primary database to read-only operations, after the level-zero backup has been copied to the upgraded primary database and the upgraded standby database. Certain additional embodiments further include exporting database metadata from the standby database to the NFS mount point, after the incremental backup has been generated. Certain additional embodiments further include importing the database metadata from the NSF mount point to the upgraded primary database. Certain additional embodiments further include starting the upgraded primary database after the database metadata has been imported from the NFS mount point. Certain additional embodiments further include triggering synchronization of the upgraded standby database with the upgraded primary database, wherein the synchronization transfers the imported database metadata to the upgraded standby database.

Various additional embodiments provide a data storage system that includes a primary database; a standby database that is synchronized with the primary database, wherein the standby database is mounted to an NFS (Network File System) mount point; and wherein the standby database is configured to generate a level-zero backup of the standby database, wherein the level-zero backup is output to the NFS mount point, and wherein the standby database is further configured to generate an incremental backup of the standby database, wherein the incremental backup is output to the NFS mount point, and wherein the incremental backup reflects the changes to the primary database since the generation of the level-zero backup; an upgraded primary database that is mounted to the NFS mount point, wherein the upgraded primary database is configured to copy the level-zero backup from the NFS mount point, and wherein the upgraded primary database is configured to copy the incremental backup from the NFS mount point; and an upgraded standby database that is mounted to the NFS mount point, wherein the upgraded standby database is configured to copy the level-zero backup from the NFS mount point, and wherein the upgraded standby database is configured to copy the incremental backup from the NFS mount point.

In certain additional data storage system embodiments, the primary database is restricted to read-only operations after the level-zero backup has been copied to the upgraded primary database and the upgraded standby database. In certain additional data storage system embodiments, the standby database is further configured to export database metadata to the NFS mount point, after the incremental backup has been generated. In certain additional data storage system embodiments, the upgraded primary database is further configured to import the database metadata from the NSF mount point. In certain additional data storage system embodiments, the upgraded primary database is started after the database metadata has been imported from the NFS mount point. In certain additional data storage system embodiments, the upgraded standby database is synchronized with the upgraded primary database transfer the imported database metadata to the upgraded standby database.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, a network router, a network video camera, a data recording device used to record physical measurements in a manufacturing environment, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail with respect to FIG. 1.

Figure 1:
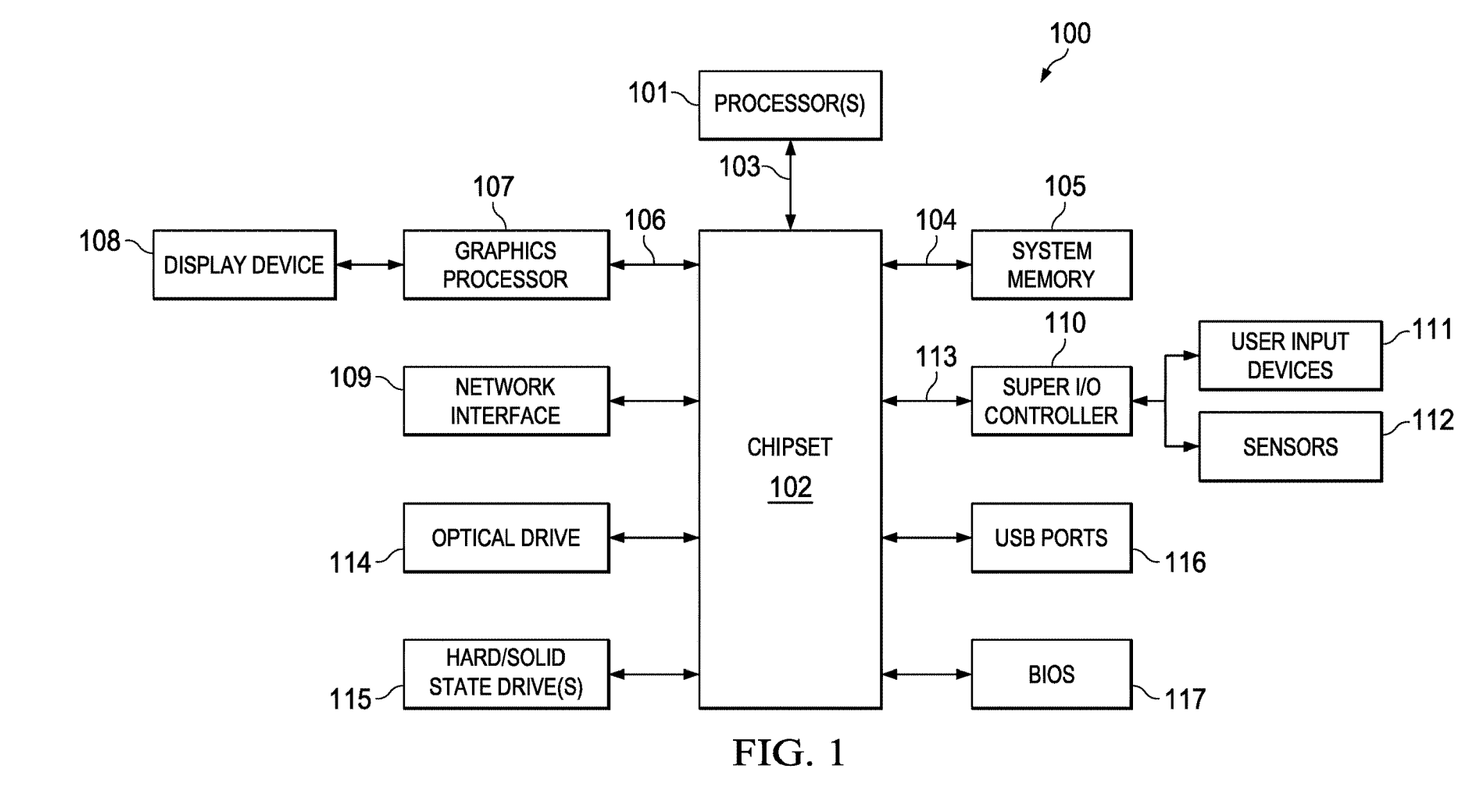
FIG. 1 is a block diagram depicting certain components of an IHS configured according to various embodiments.

FIG. 1 is a block diagram of an IHS 100 configured according to certain embodiments. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a memory I/O hub chipset 102 comprising one or more integrated circuits that connect to processor(s) 101 over a front-side bus 103. Memory I/O hub 102 provides the processor(s) 101 with access to a variety of resources. For instance, memory I/O hub 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), synchronous dynamic RAM (SDRAM), nonvolatile/Flash-type memory, or any other type of memory.

Memory I/O hub 102 may also provide access to a graphics processor 107. In certain embodiments, graphics processor 107 may be comprised within one or more video or graphics cards that have been installed on IHS 100. Graphics processor 107 may be coupled to the memory I/O hub 102 via a graphics bus 106 such as provided an AGP (Accelerated Graphics Port) bus or a PCI (Peripheral Component Interconnect or) bus. In certain embodiments, graphics processor 107 generates display signals and provides them to a coupled display device 108.

In certain embodiments, memory I/O hub 102 may also provide access to one or more user input devices 111. In such embodiments, memory I/O hub 102 may be coupled to a super I/O controller 110 that provides interfaces for variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communication with one or more sensor devices 112, which may include environment sensors, such as a temperature sensor or other cooling system sensor. The I/O devices, such as the user input devices 111 and the sensor devices 112, may interface super I/O controller 110 through wired or wireless connections. In certain embodiments, the super I/O controller 110 may be coupled to the super I/O controller 110 via a Low Pin Count (LPC) bus 113.

Other resources may also be coupled to IHS 100 through the memory I/O hub 102. In certain embodiments, memory I/O hub 102 may be coupled to a network interface 109, such as provided by a Network Interface Controller (NIC). According to various embodiments, network interface 109 may support communication via various wired and/or wireless networks. Memory I/O hub 102 may also provide access to one or more hard disk and/or solid state drives 115. In certain embodiments, access may be provided to an optical drive 114 or other removable-media drive. Any or all of the drive devices 114 and 115 may be integral to the IHS 100, or may be located remotely from the IHS 100. In certain embodiments, access may be provided to one or more Universal Serial Bus (USB) ports 116.

Another resource that may be accessed by processor(s) 101 via memory I/O hub 102 is BIOS 117. The BIOS 117 provides an abstraction layer for interfacing with certain hardware components that are utilized by IHS 100. Via this hardware abstraction layer provided by BIOS 117, the software executed by the processor(s) 101 of IHS is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. Upon booting of the IHS 100, processor(s) 101 may utilize BIOS 117 instructions to initialize and test hardware components coupled to the IHS and to load an Operating System (OS) for use by the IHS 100.

Not all IHSs 100 include each of the components shown in FIG. 1, and other components not shown may exist. Furthermore, some components shown as separate may exist in an integrated package or be integrated in a common integrated circuit with other components. For example, various of the resources provided via memory I/O hub 102 may instead be integrated into the one or more processor(s) 101 as a system-on-a-chip.

Figure 2A:
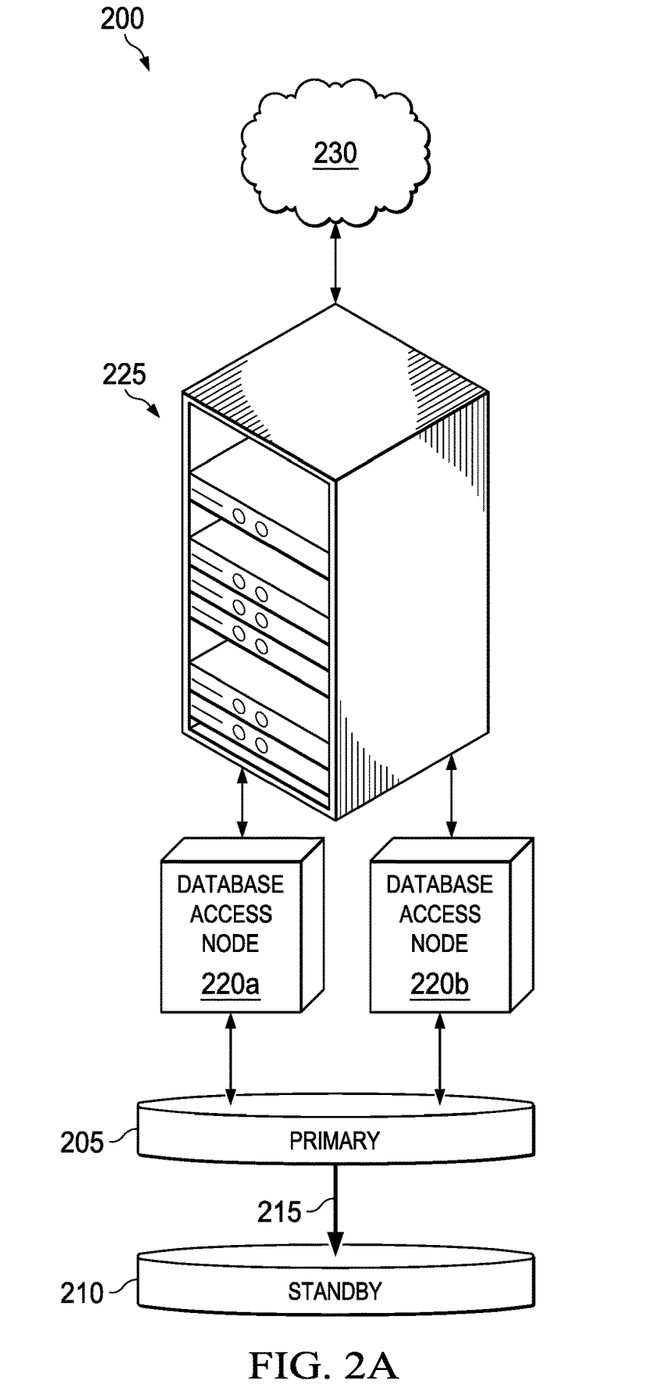
FIG. 2a is a diagram depicting certain components of a system configured to provide access to a primary database backed by a standby database.

FIG. 2*a* is a diagram depicting certain components of a system 200 that is configured to provide access to a primary database 205 that is backed by a standby database 210. The standby database 210 and the primary database 205 may each be implemented using one or more IHSs, such as described in FIG. 1. The standby database 210 is a duplicate copy of the primary database 205. The standby database 210 is synchronized with the primary database 205 such that the each transaction made on the primary database 205 is replicated on the standby database 210. In certain embodiments, the synchronization of the standby database 210 with the primary database 205 is managed by a synchronization process 215 that transmits and applies any changes from the primary database 205 to the standby database 210. In certain embodiments, the synchronization process 215 may be an entirely automated process, while certain embodiments may include certain manual aspects. In certain embodiments, the primary and standby databases are ORACLE databases and are configured as primary and standby databases as supported by ORACLE databases. In such scenarios, the synchronization of the standby database with the primary database may be provided as an integrated feature of the ORACLE databases.

The synchronization of the standby database 210 with the primary database 205 allows the standby database 210 to be used to restore and recover the primary database 205 in the case of a disaster or failure that compromises the data stored by the primary database 205. The standby database 210 may be operated in several modes. For instance, the standby database 210 may be maintained strictly as a disaster recovery resource, such that no queries to the standby database 210 are permitted. In disaster recovery mode, the standby database 210 is synchronized with the primary database 205, but the standby database 210 is otherwise unavailable except to initiate a disaster recovery procedure. In certain scenarios, the standby database 210 may also be operated in read-only mode, which allows the standby database 210 to receive and respond to queries, thus improving availability of the data stored by the primary database 205. While configured in read-only mode, the standby database 210 continues to receive and apply synchronization updates 215 that reflect any changes to the primary database 205.

Access is provided to the primary database 205 via a pair of database access nodes 220*a* and 220*b* that are used to increase availability of the data in the primary database 205. In certain embodiments, each of the database access nodes 220*a* and 220*b* may each be implemented using individual server IHSs, such as described with respect to FIG. 1. In certain additional embodiments, one or both of the database access nodes 220*a* and 220*b* may be implemented by a cluster of IHSs. In certain embodiments, each of the database access nodes 220*a* and 220*b* may be implemented as an ORACLE RAC (Real Application Cluster).

In the described embodiment, each of the database access nodes 220*a* and 220*b* is configured with a single instance of the primary database 205. The single instances configured on each of the database access nodes 220*a* and 220*b* may concurrently access the primary database 205, thus increasing the availability of the primary database 205. In other embodiments, on or both of the database access nodes 220*a* and 220*b* may be configured with additional instances of the primary database 205, each additional instance providing another point of availability to the primary database 205. As illustrated, network users 230 may access the primary database 205 via application servers 225 that are configured to interface with the database access nodes 220*a* and 220*b* in order to access the primary database 205. The application servers 225 may provide access to the primary database 205 via any application that is configured to access a database.

Figure 3:
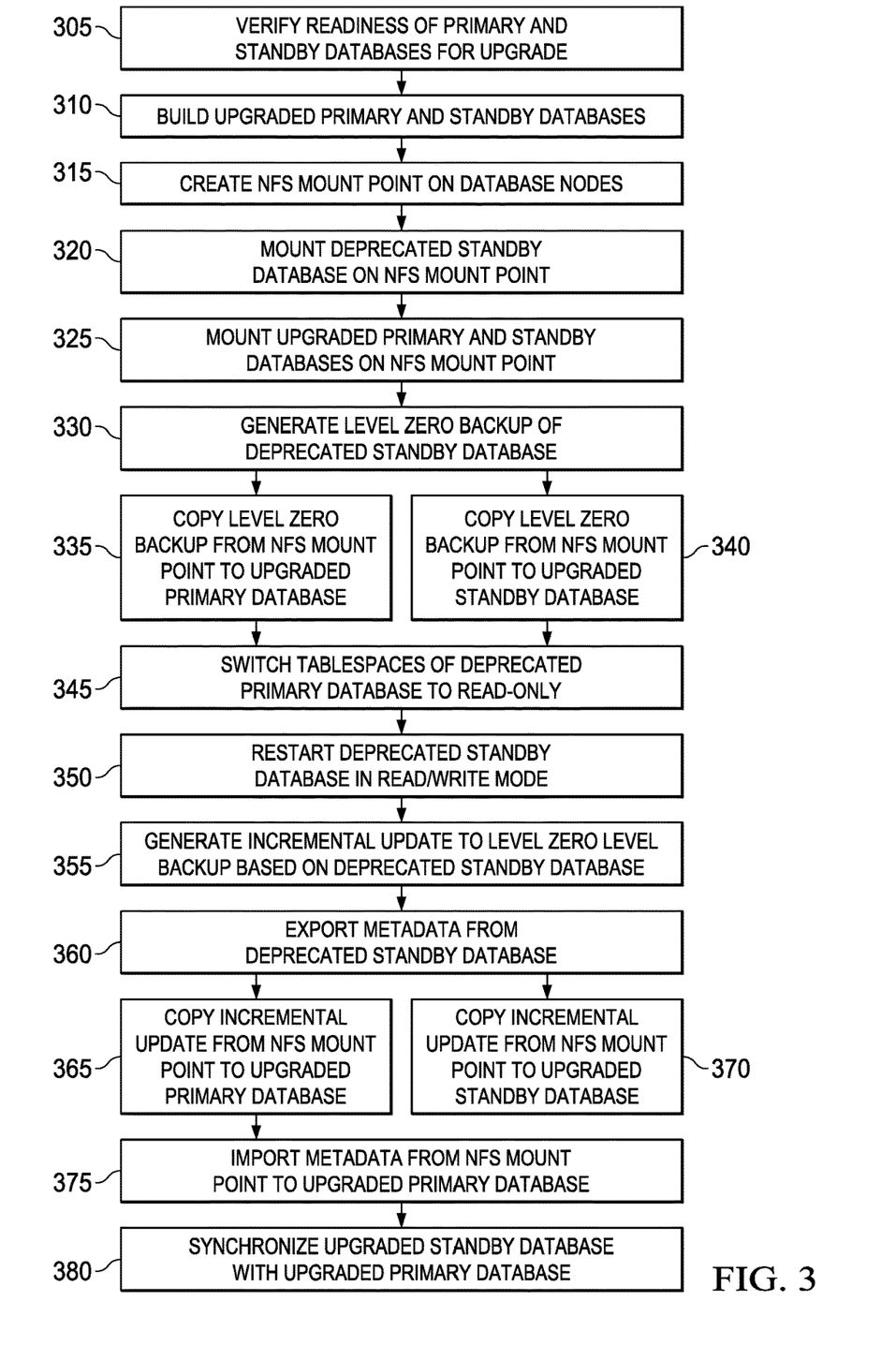
FIG. 3 is a flowchart describing certain steps of a process according to various embodiments for providing concurrent upgrades of a primary database and a standby database.

As described, various scenarios require upgrading of the primary database 205, which in turn requires updating the standby database 210. Sequential upgrading of the primary database 205 and the standby database 210 provides the most assurances that data will not be lost due to a failure in the upgrade process. However, sequential upgrading of the primary database 205 and the standby database 210 requires significant downtime, during which both database must remain offline, or the data must be subject to the risk of non-synchronized operations. FIG. 3 describing certain steps of a process according to various embodiments for providing concurrent upgrades of a primary database and a standby database in a manner that reduces the time the primary and standby database must remain offline while these databases are upgraded, while also mitigating the risk of data loss due to a failure during the upgrade process.

In the illustrated embodiment, the method of FIG. 3 begins at step 305 with the verification of the primary database 205 and the standby database 210 for upgrading. If any errors or issues are identified that prevent upgrading either of the primary database 205 or the standby database 210, upgrading does not commence until both of the databases are ready for migration of the data to the upgraded databases. Once both of the databases are confirmed as ready, the process may continue at step 310 with the building of the upgraded primary and standby databases that will replace the deprecated existing primary database 205 and standby database 210. In certain embodiments, metadata from the deprecated primary database 205 may be used to build the upgraded primary and standby databases. For instance, the metadata may specify the scheme of the standby database 210 that may then be used to build the structure for the upgraded primary and standby databases. At this point, the upgraded primary and standby databases remain empty of data files. During this building of the upgraded databases, the deprecated primary database 205 and standby database 210 remain in operation and remain synchronized.

Figure 2B:
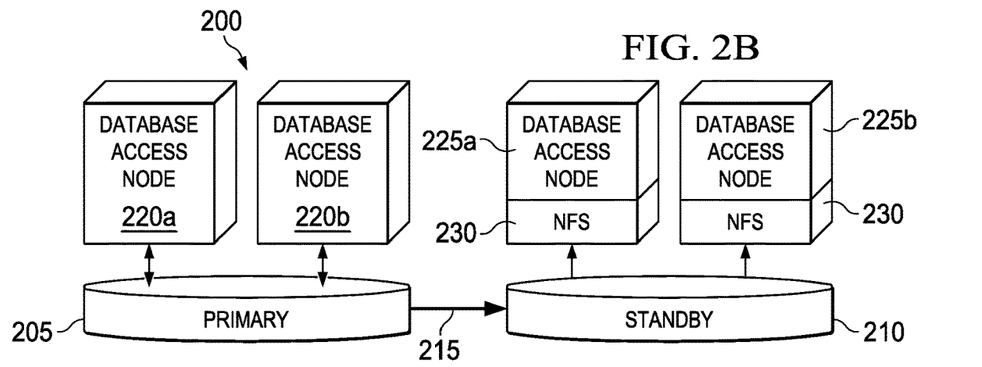
FIG. 2b is a diagram depicting certain aspects of a system that is configured according to various embodiments to provide concurrent upgrades of a primary database and a standby database.

At step 315, and as illustrated in FIG. 2*b* a mount point 230 is established on the database access nodes 225*a* and 225*b*. In certain embodiments, the mount point 230 is an NFS (Network File System) mount point, and is thus a file system directory that has been configured for use on the database access nodes 225*a* and 225*b*. In the embodiments of FIGS. 2*b-d* and 3, the mount point 230 is a logical NFS directory that spans both database access nodes 225*a* and 225*b*. In certain embodiments, the mount point 230 may be located on a single database access node rather spanning multiple nodes. In the embodiment illustrated in FIG. 2*b*, the different sets of database access nodes 220*a-b* and 225*a-b* are utilized by the primary database 205 and standby database 210, respectively. Such a configuration may be utilized to minimize the disruption in access to the primary database 205 during the upgrade process. Other embodiments may utilize a single set of database access nodes for providing access to the primary database 205 and supporting the described concurrent upgrade of the primary database 205 and the standby database 210.

Figure 2C:
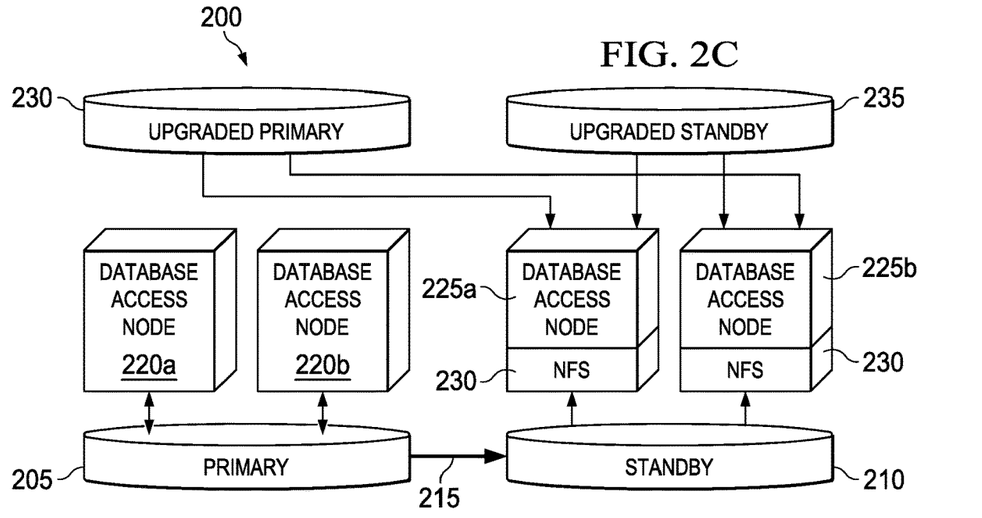
FIG. 2c is a diagram depicting certain additional aspects of a system that is configured according to various embodiments to provide concurrent upgrades of a primary database and a standby database.

At step 320, and as illustrated in FIG. 2*b*, the deprecated standby database is mounted on the NFS mount point 230 established on the database access nodes 225*a* and 225*b*. At step 325, and as illustrated in FIG. 2*c*, the upgraded primary and standby database are also both also mounted to the NFS mount point 230. Using the NFS mount point 230 as a backup location, at step 330, a level-zero backup is generated of the deprecated standby database 210. A level-zero backup is a complete copy of the data files that comprise a database, while also providing the ability to generate incremental, level-one backups that include additional backup data received since the level-zero backup was generated, or since the prior incremental backup was generated. In ORACLE embodiments, the level-zero backup may be generated using the ORACLE Recovery Manager (RMAN). The level-zero backup of the deprecated standby database 210 is stored to the NFS mount point 230.

From the NFS mount point 230, also mounted by the upgraded primary database 230 and the upgraded standby database 235, the level-zero backup data is copied to each of the upgraded primary database 230 and the upgraded standby database 235. The upgraded standby database 235 and the upgraded primary database 230 may access the NFS mount point 230 concurrently, thus allowing, at steps 335 and 340, both upgraded databases to be concurrently populated with the level-zero backup data. Up to this point in the concurrent upgrade process, the deprecated primary database 205 remains operational, and the deprecated standby database 210 remains synchronized 215 with the changes to the deprecated primary database 205.

At step 345, the tablespaces of the deprecated primary database 205 are switched to a read-only mode. In read-only mode, a database may respond to queries, but its data files and structure cannot be edited. Accordingly, by placing the deprecated primary database 205 in read-only mode, the database application is, at least to a certain extent, now unavailable. At step 350, the deprecated standby database 210, previously serving as a read-only disaster recovery database, is now restarted in read/write mode. Now in read/write mode, at step 355, the deprecated standby database 210 is used to generate an incremental backup that includes all of the changes to the deprecated primary database 205 since the level-zero backup was generated at step 330. In ORACLE implementations, the incremental backup may be an incremental RMAN backup. Since the generation of the level-zero backup and up until the deprecated primary database 205 was switched to read-only mode, the deprecated standby database 210 remained synchronized. Consequently, the deprecated standby database 210 can be used to generate the incremental backup to the initial level-zero backup that was copied to the upgraded databases. In certain scenarios, multiple incremental backups may be generated by the deprecated standby database 210 in order to capture all changes to the deprecated primary database 205.

In addition to being used to generate the incremental backup, at step 360, the deprecated standby database 210 is used as the source of the metadata that provides the schema for the zero-level backup and the incremental backup data files. At steps 365 and 370, the incremental backup data is copied from the NFS mount point 230 to the upgraded primary database 230 and the upgraded standby database 235. As illustrated in FIG. 3, the copying of the incremental backup data to the upgraded primary and standby databases may be conducted concurrently. With reference to FIG. 2*c*, both the upgraded primary database 230 and the upgraded standby database 235 are mounted to the NFS mount point 230 provided by the database instances running on each of the database access nodes 225*a-b*. As described, by providing multiple database instances, the database access nodes provide concurrent access to a database. At steps 365 and 370, this concurrency provided by the databased access nodes 225a-b allows the incremental backup data to be copied to the upgraded primary database 230 and the upgraded standby database 235 in parallel. At this point, neither the deprecated nor the upgraded primary database is fully operational. Consequently, the incremental updates may be applied in parallel to the upgraded databases, thus shortening the duration of the upgrade process.

Figure 2D:
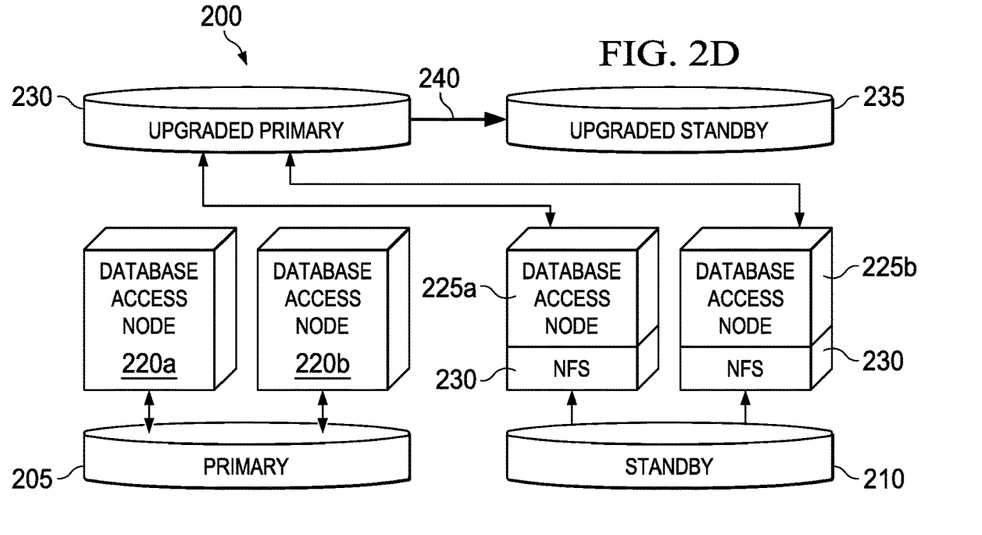
FIG. 2d is a diagram depicting certain additional aspects of a system that is configured according to various embodiments to provide concurrent upgrades of a primary database and a standby database.

As illustrated in FIG. 2d, at step 375, the metadata corresponding to the schema for the level zero and incremental backups is imported from the NFS mount point to the upgraded primary database 230. In ORACLE embodiments, the transfer of metadata may be implemented using Transportable Tablespaces (TTBS). Once the schema from the metadata is loaded by the upgraded primary database 230, the upgraded primary database 230 may be ready to be started and opened for access. In certain scenarios, additional verifications may be required before determining that the upgraded primary database 230 is ready for to be made available. As illustrated in FIG. 3, the metadata may be imported only to the upgraded primary database 230. Instead of updating the upgraded standby database 235 metadata from the NFS mount point, the upgraded standby database 235 can be converted to disaster recovery mode and the metadata may be provided to the upgraded standby database 235, at step 380, via the synchronization process 240 between the upgraded primary database 230 and the upgraded standby database 235. Configured in this manner, the upgraded primary database 230 may be started and made available as soon as the metadata has been imported and used by the upgraded primary database to construct the schema for the level-zero backup and incremental backup data.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic stripes, mechanically or optically read punched cards, or radio frequency identification tags.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for concurrently upgrading a primary database and standby database that is synchronized with the primary database, the method comprising:
   providing access to the primary database and to the standby database via a first database access node comprised of a first plurality of IHSs (Information Handling Systems);
   mounting the standby database to an NFS (Network File System) mount point on a second database access node comprised of a second plurality of IHSs;
   mounting an upgraded primary database to the NFS mount point on the second database access node;
   mounting an upgraded standby database to the NFS mount point on the second database access node;
   generating a level-zero backup of the standby database, wherein the level-zero backup is output to the NFS mount point on the second database access node, and wherein the level-zero backup comprises a complete copy of data files that comprise the standby database and further comprises an incremental backup of the standby database that includes data received since initiation of the level-zero backup standby database;
   copying the level-zero backup from the NFS mount point on the second database access node to the upgraded primary database and concurrently copying the level-zero backup from the NFS mount point on the second database access node to the upgraded standby database;

generating the incremental backup of the standby database, wherein the incremental backup is output to the NFS mount point on the second database access node, and wherein the incremental backup reflects synchronized changes to the primary database and the standby database since the generation of the level-zero backup; and copying the incremental backup from the NFS mount point on the second database access node to the upgraded primary database and concurrently copying the incremental backup from the NFS mount point on the second database access node to the upgraded standby database.

2. The method of claim 1, wherein the NFS mount point is located on one or more database access nodes.

3. The method of claim 1, further comprising:
restricting the primary database to read-only operations, after the level-zero backup has been copied to the upgraded primary database and the upgraded standby database.

4. The method of claim 3, further comprising:
exporting database metadata from the standby database to the NFS mount point, after the incremental backup has been generated.

5. The method of claim 4, further comprising:
importing the database metadata from the NSF mount point to the upgraded primary database.

6. The method of claim 5, further comprising:
starting the upgraded primary database after the database metadata has been imported from the NFS mount point.

7. The method of claim 6, further comprising:
triggering synchronization of the upgraded standby database with the upgraded primary database, wherein the synchronization transfers the imported database metadata to the upgraded standby database.

8. A computer-readable storage device having program instructions stored thereon for concurrently upgrading a primary database and standby database that is synchronized with the primary database, upon execution by a one or more processors, the program instructions cause the one or more processors to:

provide access to the primary database and to the standby database via a first database access node comprised of a first plurality of IHSs (Information Handling Systems);

mount the standby database to an NFS (Network File System) mount point on a second database access node comprised of a second plurality of IHSs;

mount an upgraded primary database to the NFS mount point on the second database access node;

mount an upgraded standby database to the NFS mount point on the second database access node;

generate a level-zero backup of the standby database, wherein the level-zero backup is output to the NFS mount point on the second database access node, and wherein the level-zero backup comprises a complete copy of data files that comprise the standby database and further comprises an incremental backup of the standby database that includes data received since initiation of the level-zero backup standby database;

copy the level-zero backup from the NFS mount point on the second database access node to the upgraded primary database and concurrently copying the level-zero backup from the NFS mount point on the second database access node to the upgraded standby database;

generate the incremental backup of the standby database, wherein the incremental backup is output to the NFS mount point on the second database access node, and wherein the incremental backup reflects synchronized changes to the primary database and the standby database since the generation of the level-zero backup; and copy the incremental backup from the NFS mount point on the second database access node to the upgraded primary database and concurrently copying the incremental backup from the NFS mount point on the second database access node to the upgraded standby database.

9. The computer-readable storage device of claim 8, wherein the NFS mount point is located on one or more database access nodes.

10. The computer-readable storage device of claim 8, the program instructions further causing the one or more processors to:
restrict the primary database to read-only operations, after the level-zero backup has been copied to the upgraded primary database and the upgraded standby database.

11. The computer-readable storage device of claim 10, the program instructions further causing the one or more processors to:
export database metadata from the standby database to the NFS mount point, after the incremental backup has been generated.

12. The computer-readable storage device of claim 11, the program instructions further causing the one or more processors to:
import the database metadata from the NSF mount point to the upgraded primary database.

13. The computer-readable storage device of claim 12, the program instructions further causing the one or more processors to:
start the upgraded primary database after the database metadata has been imported from the NFS mount point.

14. The computer-readable storage device of claim 13, the program instructions further causing the one or more processors to:
trigger synchronization of the upgraded standby database with the upgraded primary database, wherein the synchronization transfers the imported database metadata to the upgraded standby database.

15. A data storage system comprising:
a primary database;
a first database access node comprised of a first plurality of IHSs (Information Handling Systems), wherein the first database access node provides access to the primary database and to a standby database;
the standby database that is synchronized with the primary database, wherein the standby database is mounted to an NFS (Network File System) mount point on a second database access node comprised of a second plurality of IHSs; and wherein the standby database is configured to generate a level-zero backup of the standby database, wherein the level-zero backup is output to the NFS mount point on the second database access node, and wherein the level-zero backup comprises a complete copy of data files that comprise the standby database and further comprises and further comprises an incremental backup of the standby database that includes data received since initiation of the level-zero backup standby database, and wherein the standby database is further configured to generate the incremental backup of the standby database, wherein the incremental backup is output to the NFS mount point on the second database access node, and wherein the incremental backup reflects synchronized changes to the primary database and the standby database since the generation of the level-zero backup;

an upgraded primary database that is mounted to the NFS mount point on the second database access node, wherein the upgraded primary database is configured to copy the level-zero backup from the NFS mount point on the second database access node, and wherein the upgraded primary database is configured to copy the incremental backup from the NFS mount point on the second database access node; and an upgraded standby database that is mounted to the NFS mount point on the second database access node, wherein the upgraded standby database is configured to copy the level-zero backup from the NFS mount point, and wherein the upgraded standby database is configured to copy the incremental backup from the NFS mount point on the second database access node.

16. The system of claim 15, wherein the primary database is restricted to read-only operations after the level-zero backup has been copied to the upgraded primary database and the upgraded standby database.

17. The system of claim 16, wherein the standby database is further configured to export database metadata to the NFS mount point, after the incremental backup has been generated.

18. The system of claim 17, wherein the upgraded primary database is further configured to import the database metadata from the NSF mount point.

19. The system of claim 18, wherein the upgraded primary database is started after the database metadata has been imported from the NFS mount point.

20. The system of claim 19, wherein the upgraded standby database is synchronized with the upgraded primary database transfer the imported database metadata to the upgraded standby database.

* * * * *